United States Patent [19]

White

[11] 4,372,420
[45] * Feb. 8, 1983

[54] SEISMIC EXPLORATION SYSTEM

[75] Inventor: Arlton H. White, Dallas, Tex.

[73] Assignee: Texas Instruments Incorporated, Dallas, Tex.

[*] Notice: The portion of the term of this patent subsequent to Feb. 13, 1996, has been disclaimed.

[21] Appl. No.: 8,902

[22] Filed: Feb. 2, 1979

Related U.S. Application Data

[63] Continuation of Ser. No. 731,400, Oct. 12, 1976, Pat. No. 4,139,074.

[51] Int. Cl.³ .............................................. G01V 1/38
[52] U.S. Cl. ................................... 181/120; 181/110; 181/114
[58] Field of Search .............. 181/109, 110, 113, 114, 181/118, 120, 122

[56] References Cited

U.S. PATENT DOCUMENTS 3,623,570  11/1971  Holloway ............................ 181/118
4,016,951  4/1977  Dick et al. ........................... 181/109

FOREIGN PATENT DOCUMENTS 826932  1/1960  United Kingdom ................ 181/120

OTHER PUBLICATIONS

"GSI's Ice Gun Technique Looks Promising in Alaska Slope Tests", *The Grapevine*, 1970, May–Jun., pp. 10–11.

*Primary Examiner*—Richard A. Farley
*Attorney, Agent, or Firm*—Melvin Sharp; N. Rhys Merrett; Thomas G. Devine

[57] ABSTRACT

Seismic exploration method in arctic regions involving the generation of a seismic disturbance in the water beneath the ice in areas where conventional marine and land exploration methods are functionally inadequate. Seismic disturbances are generated by an air gun assembly which automatically executes lowering air guns through apertures in the ice and retrieving them while carrying out preventive measures against freeze-ups. Seismic sensing and recording equipment are positioned within an appropriate range to detect seismic data in the form of reflective or diffractive signals generated in response to the seismic disturbance after actuating the air gun array, wherein the seismic data is indicative of sub-surface structural formations existing below the body of water.

4 Claims, 5 Drawing Figures

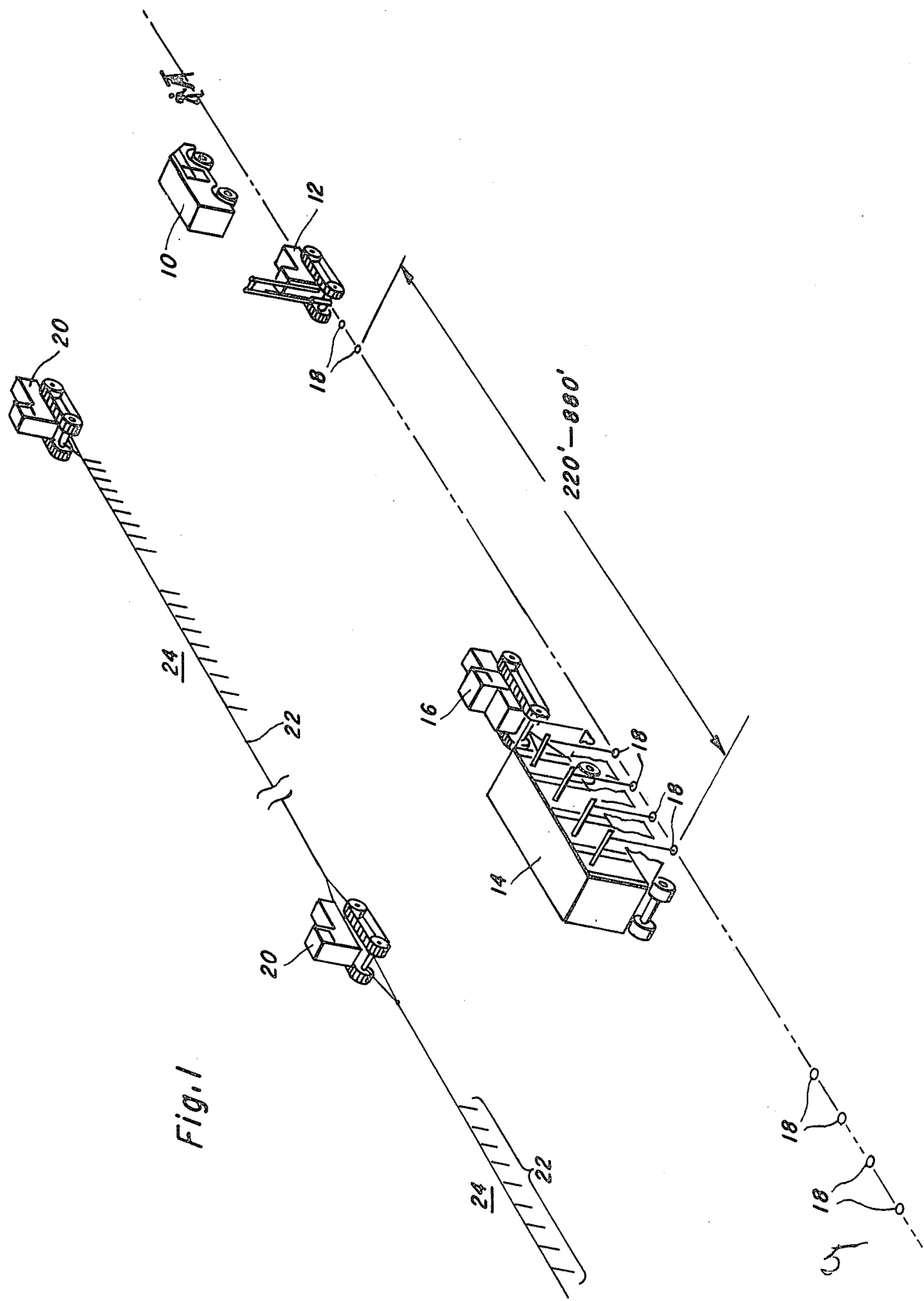

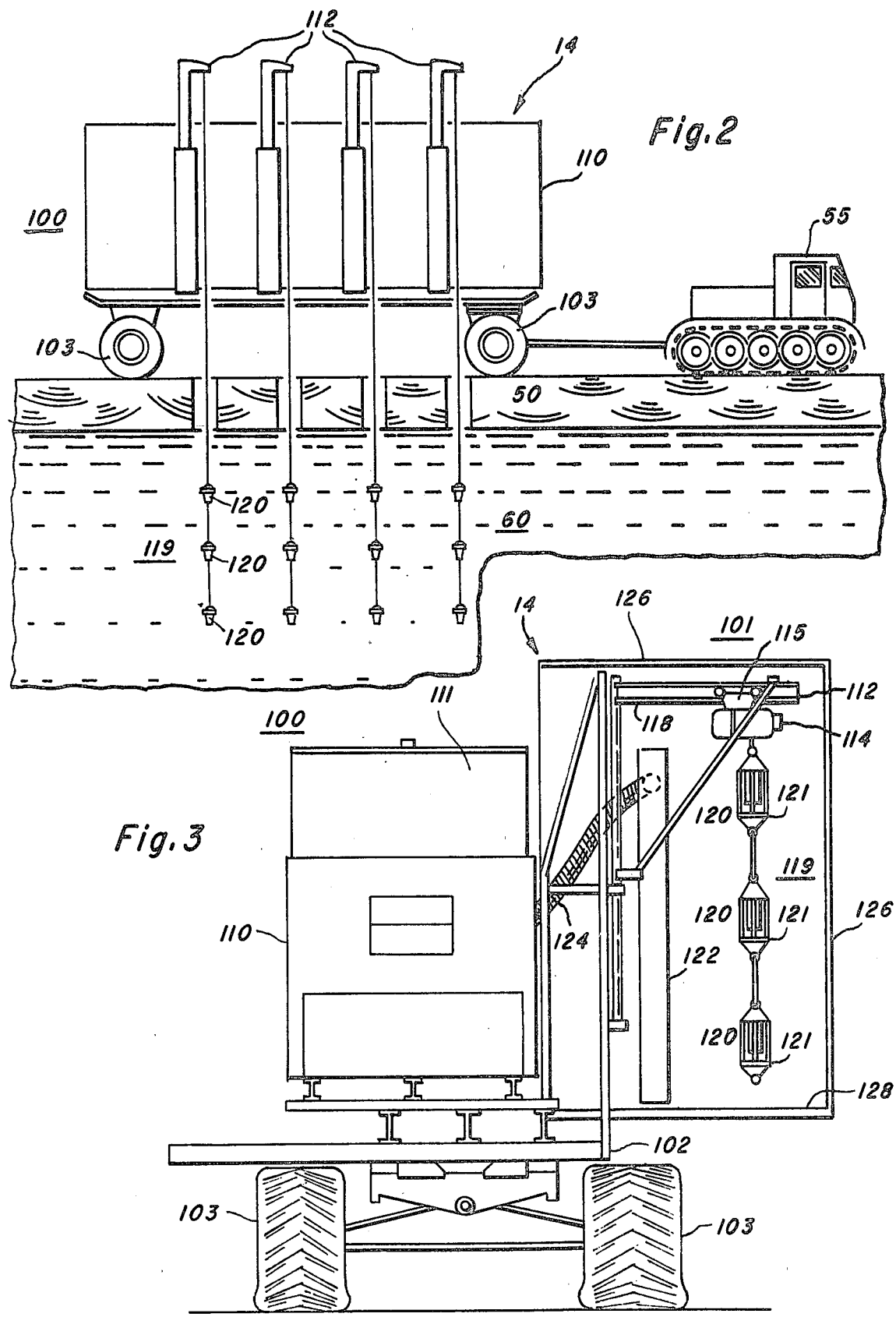

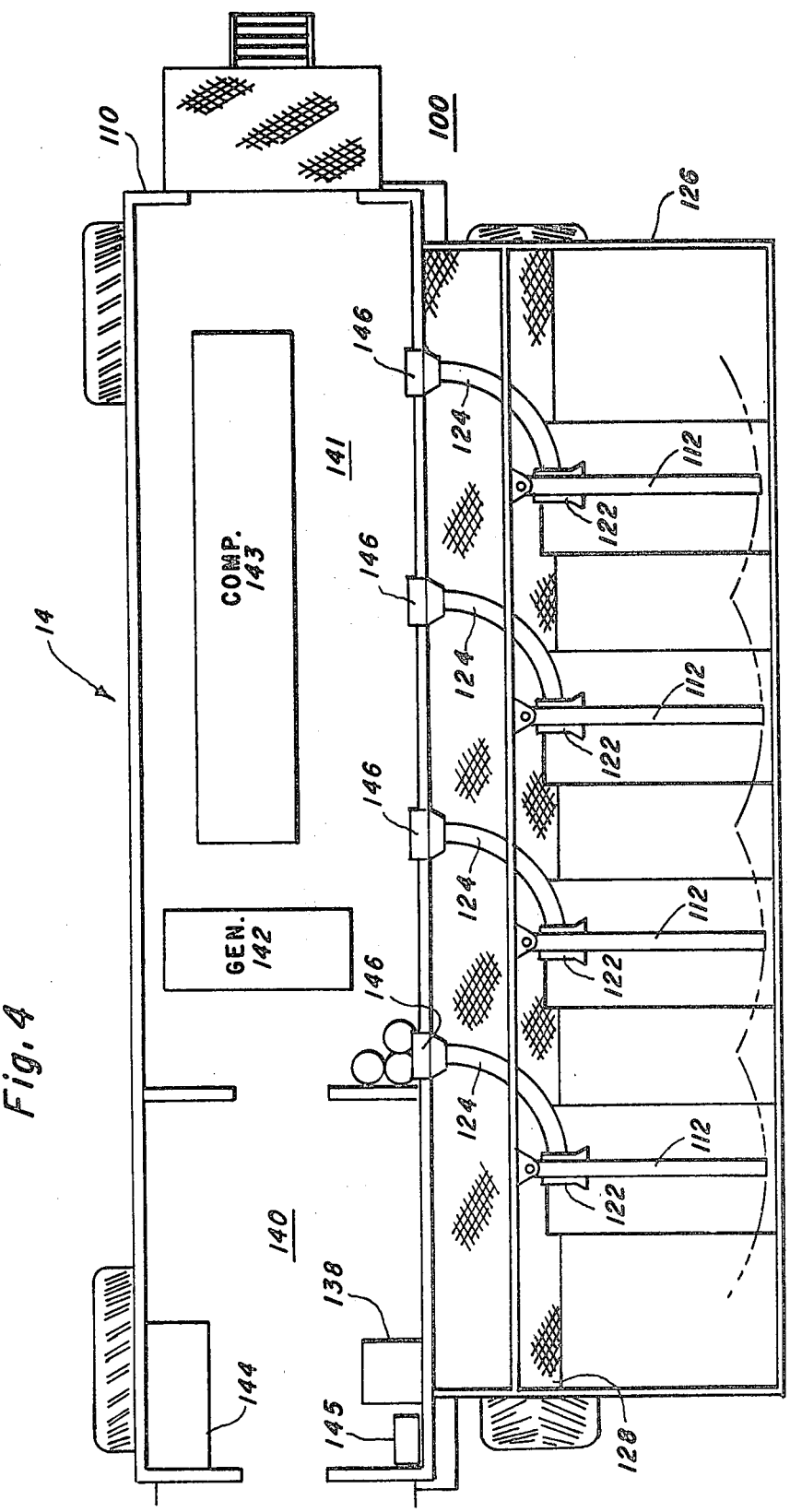

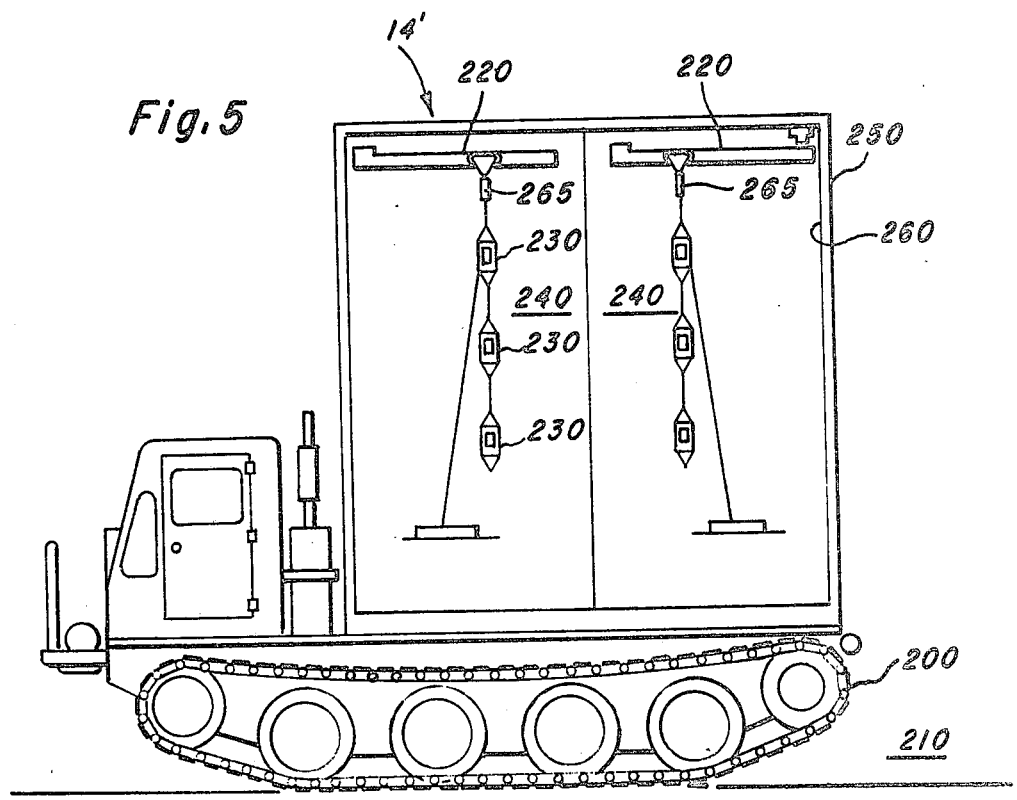

SEISMIC EXPLORATION SYSTEM

This is a continuation of application Ser. No. 731,400, filed Oct. 12, 976, now U.S. Pat. No. 4,139,074.

BACKGROUND OF THE INVENTION

This invention relates to arctic seismic exploration, and more particularly to a method and apparatus for generating seismic disturbances in the water below an ice layer, and recording seismic data in the form of reflective or diffractive signals generated in response to the seismic disturbances by sub-surface structural formations existing below the body of water.

Arctic exploration methods and equipment must overcome the problems of the ice-water terrain and frigid arctic temperatures. Since the ice most resembles a land terrain, heretofore methods of seismic exploration used on ice were similar to those of land exploration. This method involved using explosive charges in the form of point charges or a dispersed charge in the water beneath the ice depending on the distribution of energy desired. A recording truck towing a land cable having sections of geophones attached thereto is placed within an appropriate range to detect the seismic signal data created by the explosive charges. The two major problems with the land exploration method used on ice terrain and environmental and economic in nature. Environmentally, use of explosive charges in the water beneath the ice is found to be harmful to the water life therein. Economically, the use of explosive charges over other methods of generating seismic sources is far more expensive.

In marine seismic exploration, seismic events are created by detonating an explosive charge or by generating gaseous explosions using compressed air guns. There are also electrical discharge systems using an underwater spark to create an acoustic pulse, but these are mostly broadband and so generally inefficient with reference to narrow frequency bands of interest in seismic exploration. The seismic signal data generated by the seismic disturbance is detected by hydrophones attached to a streamer towed by a boat through the water.

Considering the terrain involved in arctic exploration, it is impossible to use a pure marine system. And, for the reasons described above, a pure land exploration system is not practical for arctic exploration. Although an air gun has been used in arctic regions to discharge air creating a seismic disturbance in the water beneath the ice and the seismic signal data from such disturbances has been recorded by geophones, this technique has been generally unreliable because of difficulties encountered in the operation of the air gun under the extreme conditions encountered in arctic regions. Also, air gun handling in both marine and primitive arctic methods heretofore employed has been manually accomplished, thus giving rise to a possible safety hazard and increasing the time cycle of exploration, which is defined by the time needed to create and record a seismic disturbance.

SUMMARY OF THE INVENTION

In accordance with the present invention, an improved method and apparatus for seismic exploration in arctic regions using air guns as the seismic source units is disclosed, in which the seismic source units are protected from frigid arctic temperatures.

The method of arctic seismic exploration involves the making of a preliminary survey to determine a line of seismic exploration. A surveying unit will then proceed along this line of seismic exploration, there marking out segments of the ice layer to be explored. A marker is placed at each point in the segment where an aperture is to be made in the ice layer for purposes of introducing an array of seismic source units into the water beneath the ice layer. After apertures are made in the ice layer at predetermined locations, a vehicular apparatus carrying seismic source units in the form of air guns is positioned such that the air guns which are supported from the apparatus are lowered into the apertures to the water below the ice layer. The apparatus also contains a compressor and generator unit to assist in functionally operating the air guns. Between respective activation sequences, the air guns rest in an air gun nest which is connected through duct work to a compartment where the compressor unit is disposed. Warm air as discharged from the compressor unit is utilized to heat the air guns for the purpose of preventing air gun freeze-up and malfunction. Recording vehicles are positioned so as to record seismic data from any seismic disturbance made by the air guns in the water beneath the ice layer. Seismic data from this seismic disturbance is sensed by geophones included in a land tow cable which is attached to the recording vehicles and towed along the ice layer. In a specific procedure, the recording vehicles simultaneously actuate all the air guns creating a seismic disturbance to provide seismic data from sub-surface reflective or diffractive signals which is sensed by the geophones of the land cable and immediately recorded by monitoring equipment. The entire operation then moves to the next set of apertures in the ice layer and repeats the procedure of lowering the air guns into the water through the aperture(s), actuating the air guns and recording seismic signal data from the seismic disturbance with monitoring equipment in the recording vehicles. It has been found that by using air guns to generate seismic disturbances creating seismic events in the water beneath the ice layer, it is possible to obtain good seismic data which is comparable to that obtained with explosives; while air gun use does not have the detrimental environmental, or economic limitations of the prior method.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a schematic view of an arctic seismic exploration system according to the present invention;

FIG. 2 is a side elevation view of an apparatus used in the seismic exploration system illustrating an air gun array beneath the ice layer;

FIG. 3 is an end elevation view of the apparatus shown in FIG. 2;

FIG. 4 is a top plan view of the apparatus shown in FIGS. 2 and 3; and

FIG. 5 is a side elevation view of a further embodiment of apparatus used in arctic seismic exploration in accordance with the present invention.

DETAILED DESCRIPTION OF THE DRAWINGS

Referring now to FIG. 1, there is illustrated an arctic seismic exploration system according to the present invention. This system, shown in the preferred configuration to carry out the method of seismic exploration, may be utilized in arctic and antarctic operations, such as, for example, on the North Slope of Alaska, but it will be understood that such an operation is equally applicable in any body of water covered by an ice layer.

The method of seismic exploration according to the present invention initially involves surveying a predetermined path of seismic exploration along a terrain including a layer of ice covering a body of water, and there marking off respective segments along the path on the ice layer to designate aperture locations. To this end, a survey unit 10 leads the seismic exploration team setting down markers in the ice layer as it plots out the course of exploration. The survey unit 10 is followed by an aperture-forming vehicle unit 12 or other appropriate means of forming apertures 18 through the ice layer to the water below. Preferably, the aperture-forming vehicle unit 12 is an endless track vehicle to facilitate movement over the ice layer and equipped with drill units. Respective sets of apertures 18 are formed in the ice layer by suitable means, such as by operating appropriate drill units on the vehicle unit 12 to drill holes through the ice layer at each of the locations designated by the markers. An apparatus for arctic seismic exploration 14, to be hereinafter described, is towed by a caterpillar tractor vehicle 16 over the ice layer. This apparatus 14 is pulled into position over the apertures 18 where air guns (not shown) are lowered into the apertures 18 to create a seismic disturbance in the water beneath the ice layer. It is to be noted that the apertures 18 are formed in the ice layer with each set of apertures 18 separated by a distance in the range of approximately 220 to 880 feet apart, depending upon the scope of coverage desired. Recording vehicles 20 towing a land cable 24 are located in substantially parallel spaced relationship to the apertures 18 made in the ice layer. The towed land cable 24 may be of the type described in U.S. Pat. No. 3,923,121 having a typical composition of nine geophones 22 per section of cable with each section in the range of approximately 220 feet, giving a total cable length of approximately 10,650 feet. Land cables 24 are towed over the ice layer by two recording vehicles 20. It will be understood that although the drawing of FIG. 1 shows two land cables 24 being drawn by the recording vehicles 20, a single land cable could be used with half drawn by each recording vehicle 20 or a single recording vehicle 20, or that a plurality of sections of the land cable 24 may be towed by a plurality of recording vehicles 20. The geophones 22 detect the seismic data signals produced from a seismic disturbance created by activation of an air gun array, and this information is recorded with a digital field system recorder incorporated into the recording vehicle 20. The digital field system may be of the type manufactured and sold by Texas Instruments Incorporated under the trademark, "DFS" III. The recorded information is stored and identified with the location of the seismic disturbance, to by analyzed for subsurface formations existing below the body of water which may be indicative of possible oil and/or gas pockets.

The method described above for arctic seismic exploration from the surveying to the forming of apertures in the ice layer, the generating of seismic disturbances in the body of water by activation of seismic source units lowered into the water through the apertures in the ice layer which generate seismic data signals, and the detection and recording of the seismic data signals can be completed in a relatively short time span, on the order of five minutes. It is therefore possible to obtain seismic data over a large area of terrain having an ice layer covering a body of water on any given day of operation, a feat not possible using prior seismic exploration methods.

Referring now to FIGS. 2-4, there is illustrated an apparatus 14 used in the method described above for arctic seismic exploration. The apparatus 14 comprises a vehicle 100 including a housing 110 of material capable of insulating the vehicles 100 against arctic temperatures. Housing 110 comprises a bottom wall, side and end walls within which are defined compartments 140 and 141. The vehicle 100 is supported by wheels 103 which also enable movement over the ice layer 50 depicted in FIG. 2. Vehicle 100 is towed over the ice layer 50 by a caterpillar tractor unit 55. Suitable flotation means 111 shown in FIG. 3 is disposed at the top portion of the housing 110 to aid in preventing the vehicle 100 from submerging into the water 60 below the ice layer 50 in the event of a break in the ice layer 50, thereby enabling use of escape routes for personnel trapped within the vehicle compartments 140 and 141. Polysterene is a material used for flotation means, for example.

An air gun assembly unit 101 is attached to a side wall of the housing 110 and the frame 102 of the vehicle 100. The air gun assembly unit 101 comprises a pivotal davit means 112 which is in the form of an elongated metal arm extending outwardly from the side wall of the housing 110. The elongated metal arm of the pivotal davit 112 includes upper and lower lateral flanges, with the lower flange defining a flat track 118 for supporting a pair of rollers of a horizontal trolley system 115. The air gun assembly 101 further includes an electric hoist 114 which is suspended from the horizontal trolley 115 and supported by the pivotal davit 112. The pivotal davit 112 and electric hoist 114 support an air gun array 119 which depends vertically downwardly therefrom. The air gun array 119 comprises a plurality of air guns 120 which are disposed inside their respective air gun cages 121. A generator unit 142 and a compressor unit 143 are disposed within the compartment 141 of the housing 110 and provide electric power and compressed air respectively to aid in the functional operation of the air gun assembly 101. The vehicle 100 is further provided with a horizontal platform or walkway 128 extending from the same side of the housing 110 as the air gun assembly 101. The walkway 128 is disposed at a level below the lowest air gun 120 in the array.

After the vehicle 100 is towed to the location of the apertures 18 as shown in FIG. 1, the air gun assembly 101 is readied for operation. Trap doors (not shown) in the walkway 128 are opened and the air gun array 119 is lowered through the aperture 18 into the water 60 below the ice layer 50, as shown in FIG. 2. The air guns 120 are simultaneously discharged causing seismic events in the water 60 and then withdrawn from the water and discharged in the air to prevent ice buildup on the air guns 120.

Monitoring means 138 is located in the internal compartment 140 within the housing 110. This monitoring means 138 provides an indication of the firing time of the air guns 120 and includes a warning system responsive to air gun malfunctioning. In the event of a defective air gun 120, the operator has the option of making the needed repairs with the air gun 120 in place by using walkway 128 or by removing the air gun 120 and taking it inside the housing 110 to a workbench 144 located in compartment 140. Radio equipment 145 is also located inside compartment 140 of housing 110 for a communication link with recording vehicles 20 and survey unit 10 shown in FIG. 1.

The type and size of the air gun 120 used for seismic exploration is dependent upon the frequency range desired for the seismic disturbance and the water depth at any given site along the line of exploration. The procedure of lowering the air gun array 119 into the water 60 through the apertures 18 in the ice layer 50 includes measuring the depth of the air gun array 119 in the water. If the air gun array 119 is not submerged to the proper depth, where proper depth is having adequate water above the first air gun 120 in the air gun array 119, energy will be lost upon discharge from bubbles escaping to the water surface.

Preventive measures must be taken to preserve the air guns 120 in the arctic climate. One such measure has already been discussed, that being the discharge of the air gun array 119 after withdrawal from the water 60. To this end, the air gun array 119 is stored in an air gun nest 122 when not in use. The air gun nest 122 is located beneath the elongated metal arm comprising the pivotal davit means 112 at the end thereof adjacent to the housing 110. The air gun nest 122 is connected to the compartment 141 of housing 110 by a flexible conduit or duct 124. A ventilating fan 146 is mounted in the wall of the housing and disposed at the end of the flexible conduit opposite from the air gun array 119. Warm air discharged into the compartment 141 by operation of the generator unit 142 and the compressor unit 143 is exhausted by the fan 146 so as to be directed by the flexible conduit 124 over the air guns 120 residing in the air gun nest 122 to prevent malfunction from freezing. Since any moisture in the gun mechanism will cause the air guns 120 to freeze a further preventive measure provides for chemical desiccants to be mixed with the compressed air used to discharge the air gun array 119. These chemical desiccants act as a drying agent for the internal moisture found in most compressed air units. Another means of preventing the air gun assembly unit 101 from freezing from the arctic temperature is accomplished by covering the entire air gun assembly 101 with a sheet of insulating material 126. In a preferred embodiment the insulating material 126 used for this purpose is canvas.

It is to be understood that each of the plural air gun assemblies 101 shown in FIG. 4 are of like construction to that described. Furthermore, it is contemplated that one or more such assemblies 101 may be connected to the side wall of the housing 110 of the vehicle 100, the four units shown in FIGS. 2 and 4 being by way of example only.

FIG. 5 shows an alternative embodiment of apparatus 14 used for arctic seismic exploration in accordance with the present invention, where a wagon-like vehicle is replaced by an endless track vehicle 200 to facilitate movement over the ice layer 210. A further distinction from the prior embodiment shown in FIGS. 2-4 is in the means of moving the air gun array 240 into the air gun nest (not shown) and in raising and lowering the air gun array 240. In place of the movable davit means 112 shown in the prior drawings 2-4, an x-y track 220 is provided. The x-y track 220 enables movement of the air gun array 240 over the apertures 18 in a more precise fashion, thereby preventing the operator from missing the aperture 18 in the ice layer 50 and having to manually guide the air guns 230 into the water 60. In place of an electric hoist to raise and lower the air gun, a pulley system 265 may be used to perform this function, the pulley system being operated either manually or motor-assisted. This air gun assembly is likewise attached to the side of the housing 260 of the endless track vehicle 200 and covered by a sheet of insulating material 250, such as canvas, for insulating against arctic temperatures.

Although the present invention has been shown and illustrated in terms of a specific method and apparatus it will be apparent that changes or modifications can be made without departing from the spirit and scope of the invention as defined by the appended claims.

I claim:

1. A method of marine seismic exploration in water beneath an ice layer comprising the steps of:
(a) forming an aperture extending through said ice layer,
(b) lowering at least one acoustic source through said aperture into the water,
(c) activating said acoustic source at least once while immersed in said water,
(d) withdrawing said acoustic source from said aperture, and
(e) activating said acoustic source subsequent to withdrawal from the water and prior to lowering through a second aperture.

2. A system for arctic seismic exploration in water beneath an ice layer comprising:
means for providing a plurality of apertures in said ice layer, and
mobile means for locating an array of acoustic sources at said plurality of apertures, said mobile means further comprising:
(a) means for providing energy to said array of acoustic sources,
(b) means for suspending each acoustic source of said array within a protected area over one of said apertures and for lowering the source through the aperture into the underlying water,
(c) means for actuating said array of acoustic sources while immersed in said water, and
(d) means for providing heat to said acoustic sources when located within said protected areas.

3. A system according to claim 2 wherein the source of said heat comprises said means for providing energy.

4. A system according to claim 3 further comprising conduit for directing heated air given off by said means for providing energy to said acoustic sources.

* * * * *